United States Patent [19]

Lundin et al.

[11] Patent Number: 4,614,359
[45] Date of Patent: Sep. 30, 1986

[54] VEHICLE WHEEL WITH HEIGHT ADJUSTMENT

[75] Inventors: Donald G. Lundin, Warren; Joseph J. Knable, Fenton, both of Mich.

[73] Assignee: General Motors Corporation, Detroit, Mich.

[21] Appl. No.: 714,526

[22] Filed: Mar. 21, 1985

[51] Int. Cl.[4] .............................................. B60G 3/06
[52] U.S. Cl. .................................... 280/699; 280/661; 280/692; 280/718; 267/19 R; 267/36 A
[58] Field of Search ............... 280/699, 701, 696, 694, 280/718, 724, 707, 704, 661, 662, 666, 668, 724, 692; 267/615, 19 R, 20 R, 36 A

[56] References Cited

U.S. PATENT DOCUMENTS

| | | | |
|---|---|---|---|
| 2,123,089 | 5/1938 | Leighton | 280/661 |
| 2,141,781 | 12/1938 | Allen | 280/699 |
| 3,588,141 | 1/1971 | Honda | 280/699 |
| 3,717,354 | 2/1973 | Ritter | 280/692 |
| 3,781,033 | 12/1973 | Buchwald | 280/724 |

Primary Examiner—Richard A. Bertsch
Attorney, Agent, or Firm—Dean L. Ellis

[57] ABSTRACT

Automotive vehicle wheel and spring suspension of the type including a transversely extending leaf spring is adapted to effect adjustment of the vehicle sprung mass or chassis to a desired height or level attitude by manipulation of a spring connector assembly effective to raise and lower the outboard end of the spring independently of alteration of the wheel guidance apparatus of the suspension.

3 Claims, 5 Drawing Figures

VEHICLE WHEEL WITH HEIGHT ADJUSTMENT

This invention relates to automotive vehicle suspension and more particularly to such suspensions wherein adjustment of the vehicle height and trim or attitude may be readily effected.

The present invention particularly provides a vehicle height and attitude adjusting suspension spring arrangement in automotive suspension of the type employing a transverse leaf spring between the sprung and unsprung masses of the vehicle. In this and in other particular types of springs used in automotive suspension, as is well known, the design of the suspension always includes selection of the spring shape and dimensions in unloaded condition as well as its rate of deflection under load, all to properly accomplish, inter alia, a suitable level attitude for the finally assembled vehicle. Since various vehicle weights occur even in a specific vehicle model due to various combinations of accessories, it is often necessary to design a plurality of different selections of springs each for a different range of vehicle weight, thus requiring additional assembly plant inventory, part manufacturing costs, etc.

The invention has as its principle object the provision of a height adjustable suspension spring arrangement wherein the number of various selections of springs can be substantially reduced in the assembly plant inventory but proper vehicle height and trim still obtained. The invention features a height adjusting connector assembly which, in the case of a vehicle suspension employing a transverse leaf spring, can be conveniently associated with the outboard end of the transverse leaf spring for connection thereof to the unsprung mass or wheel assembly of the vehicle upon which the spring end applies the sprung vehicle load. In its broader aspects, the invention may be employed in a variety of connecting arrangements between such spring ends and the unsprung mass, or indeed be applied other than purely in a transverse spring configuration of suspension, as will be readily apparent from the specification which follows. However, in a preferred form, the invention has particular utility in a suspension arrangement where the wheel support member is guided by a lower lateral control arm or arms coacting with a conventional hydraulic shock strut or other upper guidance structure. A transverse leaf spring is applied in such arrangement as a separate load bearing member only, formed of composite material such as fiber glass reinforced polyester resin or the like not suitable to the shaping therein, as would be the case in steel, of an integral end connection or eye.

The prior art does includes height adjusting suspension arrangements for coil springs such as in Buchwald U.S. Pat. No. 3,781,033 and Ritter U.S. Pat. No. 3,717,354 and in the case of leaf springs also includes Leighton U.S. Pat. No. 2,123,089 wherein a transverse leaf spring is installed between the vehicle sprung mass and the wheel not only as the primary elastic medium but also to function as the guiding lateral control arm. There, an eccentric screw is employed to vary the wheel camber setting in relation to the lateral control arm linkage, in what has become well known manner.

The principle object, feature and advantage of the present invention is the provision of suspension arrangement improved over such prior art wherein proper vehicle height and trim is established in the assembly plant or thereafter by simple and economical means which are independent of and will not appreciably disturb the wheel alignment settings otherwise obtained in the suspension apparatus. The vehicle suspension spring is adjusted for vehicle height and trim proposed completely independently of an alteration of the connection between the lateral control arm and wheel support member. Furthermore, the invention avoids practicing the use of shims, which is so often objectionable in the assembly plant and elsewhere.

In the context of suspension systems employing fiber glass reinforced polymeric resin or like leaf springs, the present invention further provides a simple and inexpensive expedient for the interconnection of such a spring within a height adjusting connector assembly in a way to avoid complex shapes of the spring end or highly localized stress conditions, therein.

The foregoing and other objects, features and advantages of the invention will be readily apparent from the following specification and from the drawings wherein.

Figure 1:
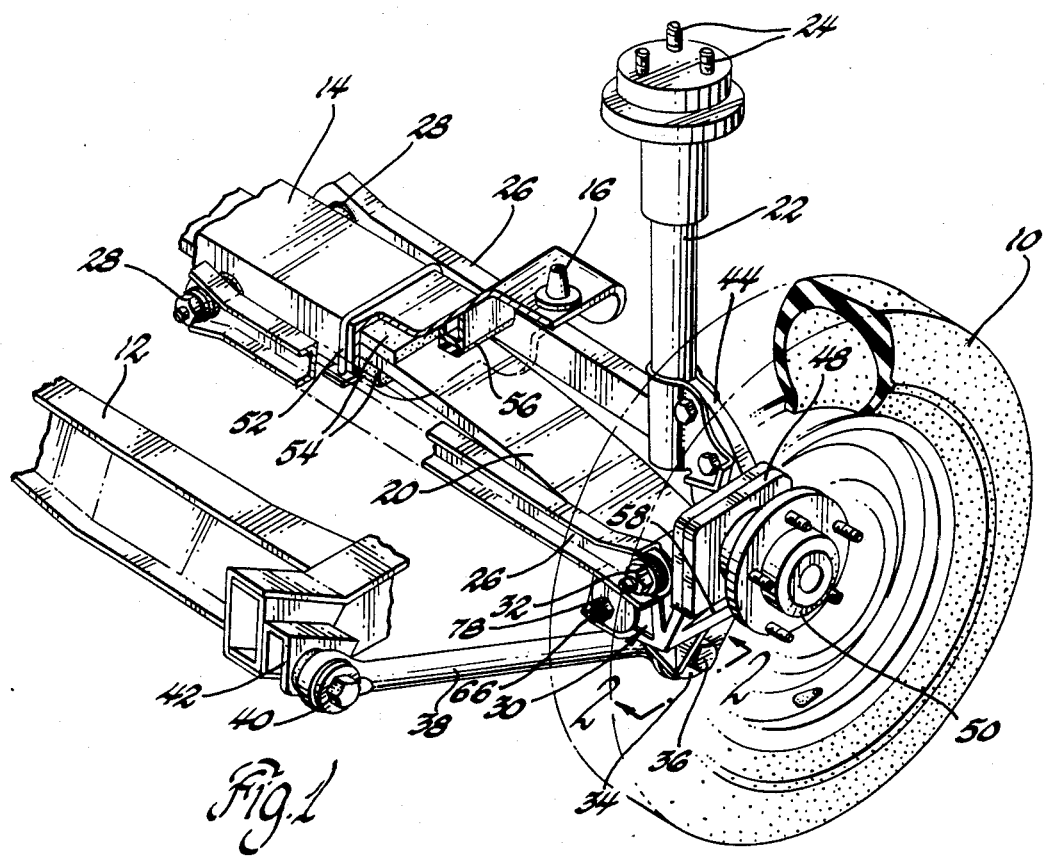
FIG. 1 is a fragmentary, partially broken away perspective view of a vehicle wheel suspension in accordance with the invention.

Referring now particularly to FIG. 1 of the drawings, the same illustrates in fragmentary fashion a vehicle suspension according to the invention for a road wheel assembly 10 located at one side of the vehicle, and for illustrative purposes only the rear end thereof. It will be understood that in the specific embodiment discussed hereinafter for this one wheel, a mirror image complementary suspension structure exists at the opposite vehicle side for the opposite road wheel. The invention is however not to be limited to such a total suspension arrangement in that the principles apply equally to suspension arrangements wherein a single leaf spring suspension element serves only a respective road wheel.

The chassis and body of the vehicle is represented in the drawings by structural units thereof including a cross-member 12 which may be welded or otherwise rigidly unitary within the chassis, and a further suspension module cross-member 14 having kicked-up end portions, one of which is shown, and including suitable fastener attachments as at 16 to enable modular subassembly of the vehicle suspension and subsequent joining thereof to the main vehicle chassis. Such cross-member 14 is of generally uniform channel section from end to end to house therewithin the primary suspension leaf spring 20. Such spring is adapted to bear the vehicle sprung mass (12,14) upon the unsprung mass including wheel assembly 10 and its opposite at the other side of the vehicle.

In the specific embodiment disclosed, the vehicle suspension includes a MacPherson type wheel guidance arrangement including a shock strut 22 of well known character embodying telescopic portions housing a hydraulic damper therewithin and, at the upper such telescopic portion, suitable fasteners 24 for securing the same to an elevated chassis portion of the vehicle sprung mass, not shown. A pair of lateral control arms 26 of generally identical shallow channel configuration extend from proximate the longitudinal centerline of the vehicle and alongside the transversely extending cross-member 14, and are pivotally joined thereto by suitable conventional rubber-bushed pivot joints 28 adjacent such longitudinal center line. The control arms 26 extend substantially transversely to a like pivotal connection at their respective outboard ends with respective rubber-bushed pivot joints 32 of a wheel support knuckle or member 30 upon which wheel 10 is mounted in conventional fashion, the pivot joints being shown in more detail in FIG. 2. As also seen therein, the knuckle 30 includes a lower extension 34 securing by way of a further pivot joint 36 similar to pivot 32, the distal end of a trailing link or radius rod 38. Such rod is secured by another such rubber-bushed pivot joint 40 by suitable bracketry 42 to the chassis cross-member 12.

Thus, the illustrated suspension is of the so-called "tri-link" type, i.e. a combination of two lateral and one longitudinal control links at the lower portions of the vehicle chassis to coact with the shock strut 22 for wheel and wheel support guidance during ride motions between the sprung and unsprung masses in operation. The coaction of the shock strut 22 is accomplished by rigid securement of the lower end thereof to an upper extension 44 of the knuckle 30, as by use of a conventional saddle type bracket welded to the lower telescopic portion of the strut and affixed at its flanges by bolts to the knuckle 30. The knuckle 30 further includes the usual wheel hub and brake apparatus mounting plate 48 carrying the wheel hub assembly 50 by conventional means.

Suspension spring 20 serves as the primary resilient medium supporting the sprung mass on, in this illustrated embodiment, a suitable supporting surface directly within knuckle 30 and acts as the spring medium independently of any function of lateral guidance such as provided by control arms 26. The spring is secured at its inboard region to the cross-member 14 by way of a pair of separate U-bolt and bracket fasteners 52, one of which is shown, and suitably separated from each other, either side of the longitudinal center line, to obtain resilient reaction not only to ride motion between the sprung and unsprung masses but also to opposite wheel deflections as under centrifugal force during cornering. Suitable polymeric mounting blocks, indicated at 54, capture the resilient spring 20 within cross-member 14 under the clamping force of fasteners 52. It is contemplated that spring 20 may advantageously be of a composite structure of fiber glass reinforced polyester or like polymeric resin featuring very high modulus characteristics and relatively light weight. The mounting blocks 54 are structured to avoid degradation of the spring as by abrasion and entry of foreign material from the road. Opposite jounce bumpers, one of which is indicated at 56, are installed on the underside of cross-member 14 to engage the upper surface of spring 20 during extreme upward deflection of the wheel assembly 10.

Figure 2:
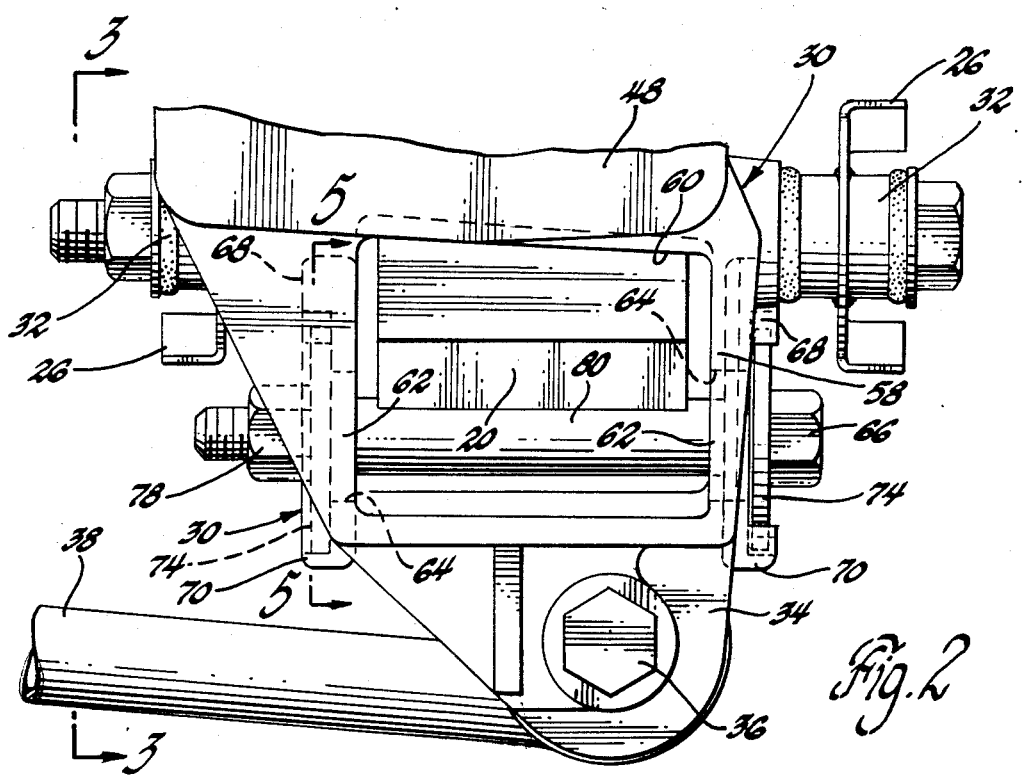
FIG. 2 is an enlarged elevational view taken generally along the plane indicated by lines 2—2 of FIG. 1.
Figure 3:
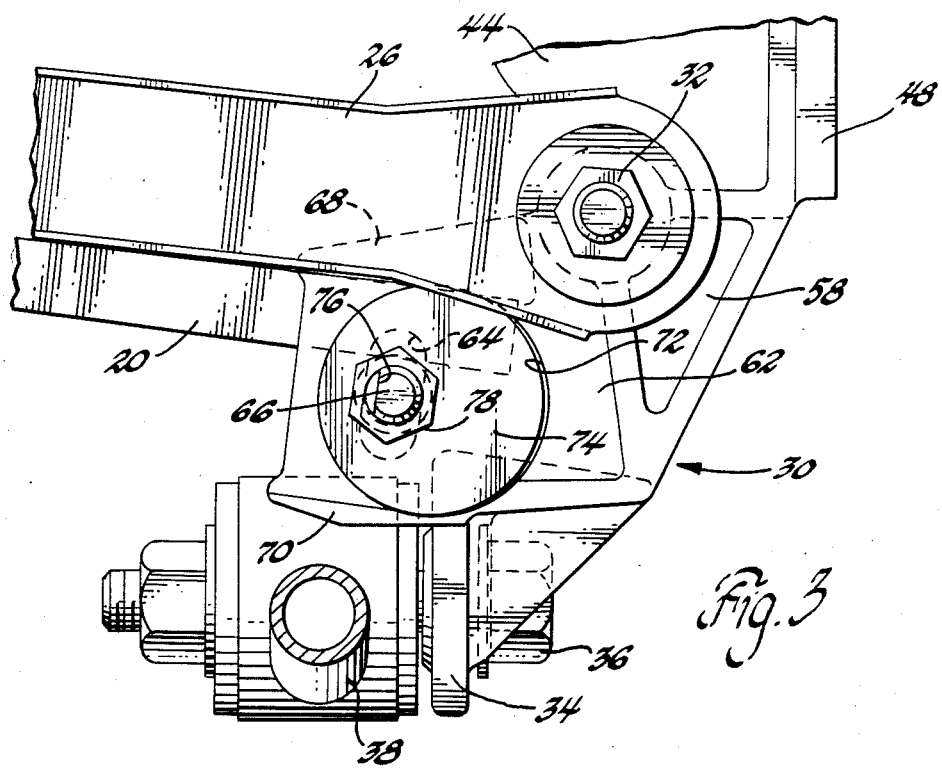
FIG. 3 is an elevational view, partially in section, taken generally along the plane indicated by lines 3—3 of FIG. 2 showing a median position for the height adjusting connector assembly of the suspension.
Figure 5:
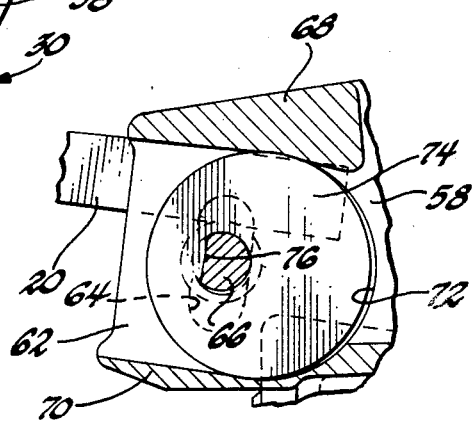
FIG. 5 is a fragmentary sectional view taken generally along the plane indicated by lines 5—5 of FIG. 2.

Referring now to FIGS. 2 and 3, the outboard or distal end of spring 20 is received in a special cavity of knuckle 30 formed within a medial portion 58 thereof. Such medial portion is cast or forged with an opening as at 60 receiving within the outlines thereof the end of the spring 20. The medial knuckle portion 58 comprises a longitudinally spaced pair of laterally extending walls partially defining such opening, such walls being indicated at 62. The walls contain aligned opposing slots indicated at 64 which receive the shank portion of a height adjusting bolt 66. The outward surface of each wall 62, to which the slot 64 opens, as seen best in FIG. 3 and at FIG. 5, is structured with recesses, i.e. extended ledges 68 and 70 merging with a partially semicircular surface relief 72. Bolt 66 has attached to the shank thereof at opposite ends thereof a pair of circular cam washers 74 received within such recesses 72 of the walls 62 and rotatable therewithin. One washer 74 is unitarily formed or welded to the head of bolt 66 while the opposite washer may have a flattened aperture 76 for unitary rotation therewith when assembled to the similarly flattened end thereof by a nut 78, FIGS. 2 and 5. The washers are of a diameter substantially matching the vertical distance or diameter across recesses 72. However, they are fixedly mounted on bolt 66 with identical eccentricity thereto.

Figure 4:
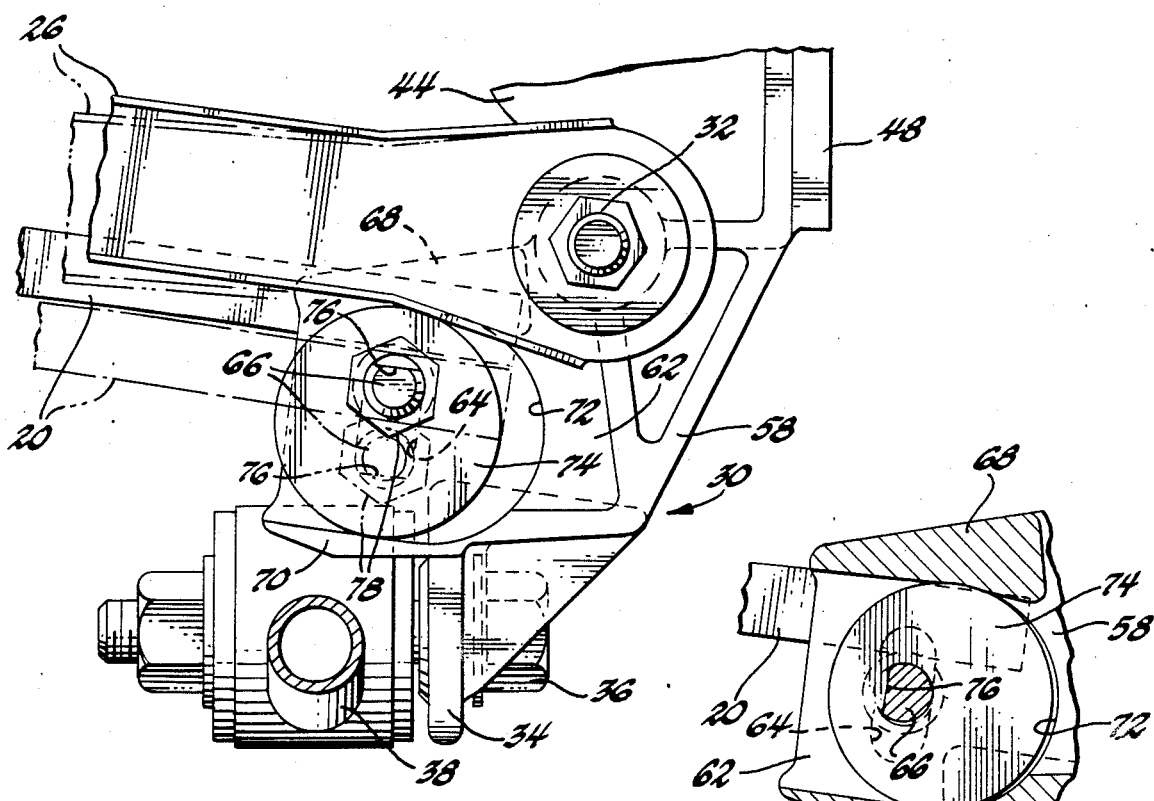
FIG. 4 is a view similar to FIG. 3 showing alternative extreme adjustment conditions in broken and solid lines respectively.

As viewed best in FIG. 3, the distal or outboard end of spring 20 bears directly upon the shank 80 of bolt 66 serving as the suited support surface aforementioned. With the eccentric washers 74 rotated to the position shown, the bolt shank occupies a median height adjustment position for the spring 20 midway the distance of slot 64. The sprung mass may be raised or lowered in continuous manner and in very fine increments by rotation of bolt 66 after loosening of nut 78. Thus, due to the eccentricity of washers 74, the bolt shank may be translated vertically in slots 64 while washers 74 nutate laterally, to any of a variety of height adjusting conditions between fully raised and fully lowered conditions indicated in solid and broken lines for spring 20 as represented in FIG. 4. In turn, raising or lowering of the end of spring 20 relative to knuckle 30 raises or lowers the vehicle sprung mass relative thereto. Similar adjustment at the opposite road wheel 10 will obtain a suitable trim or attitude and height for the vehicle if the spring 20 is in the proper rate range for the specific vehicle weight. Many fewer selections of spring rate ranges need thus be stocked for a vehicle model, and the invention is obviously much preferable to shims. Once established, the height setting is secured by tightening of nut 78.

It is seen that the instant invention provides a convenient, simple and effective height adjusting suspension arrangement for leaf spring suspensions wherein vehicle height and trim may be adjusted without any appreciable disturbance of camber, toe or other alignment parameters of the vehicle wheel guidance assemblies including the control arms 26. Thus, the connector assembly including bolt 66 is independent of such control arms and whatever attachments employed thereon to set wheel alignment. Again, the same benefits accrue where the leaf spring is employed in other than transverse orientation within the vehicle, the connector assembly including bolt 66, however, still being applied to the distal end of such spring. It is readily apparent that the distal end of the spring may alternatively connect with other parts of the unsprung mass such as on a control arm 26 rather than on the knuckle 30, and the principles of the invention still apply.

The embodiments of the invention in which an exlusive property or privilege is claimed are defined as follows:

1. In vehicle wheel spring suspension including a wheel support member and laterally extending control arm means swingably mounted by inboard pivot means thereof on the vehicle sprung mass and connected by outboard pivot means thereof to the wheel support member to constitute therewith an unsprung mass, height adjustable suspension spring means comprising a leaf spring secured to the vehicle sprung mass and extending for connection at its distal end to said unsprung mass, and a sprung mass height adjusting connector assembly interconnecting said distal end of the leaf spring with said unsprung mass independently of said outboard pivot means including means selectively adjustable in fine increments to vary the vertical relation between said distal end of the leaf spring and said unsprung mass.

2. In vehicle wheel spring suspension including a wheel support member and laterally extending control arm means swingably mounted by inboard pivot means thereof on the vehicle sprung mass and connected by outboard pivot means thereof to the wheel support member, a height adjustable suspension spring system comprising a transverse leaf spring secured at an inboard region thereof to the vehicle sprung mass and extending for connection at its outboard end to said wheel support member, and a sprung mass height adjusting connector assembly interconnecting said outboard end of the leaf spring with said wheel support member independently of said outboard pivot means, said connector assembly including bolt means selectively rotatable to carry said leaf spring outboard end in a path to vary the vertical relation thereof with said wheel support member.

3. Vehicle wheel spring suspension including a wheel support member and laterally extending control arm means swingably mounted by inboard pivot means thereof on the vehicle sprung mass and connected by outboard pivot means thereof to the wheel support member, a transverse leaf spring of polymeric material secured at an inboard region thereof to the vehicle sprung mass and extending for connection at its outboard end to said wheel support member, and sprung mass height adjusting means interconnecting said outboard end of the leaf spring with said wheel support member, said interconnecting means comprising a cam bolt rotatably mounted in said wheel support member and including a spring support portion oriented longitudinally of the vehicle sprung mass, the bottom surface of said outboard end of the leaf spring bearing upon said support portion whereby selective rotation of the cam bolt relative the wheel support member varies the vertical relation thereto of the leaf spring outboard end.

* * * * *